United States Patent [19]

Newton et al.

[11] Patent Number: 4,506,292
[45] Date of Patent: Mar. 19, 1985

[54] VIDEO DRIVER CIRCUIT AND METHOD FOR AUTOMATIC GRAY SCALE ADJUSTMENT AND ELIMINATION OF CONTRAST TRACKING ERRORS

[75] Inventors: Anthony D. Newton, Geneva, Switzerland; Geoffrey W. Perkins, Chandler, Ariz.

[73] Assignee: Motorola, Inc., Schaumburg, Ill.

[21] Appl. No.: 657,467

[22] Filed: Oct. 3, 1984

Related U.S. Application Data

[63] Continuation of Ser. No. 388,281, Jun. 14, 1982, abandoned.

[51] Int. Cl.³ .................. H04N 5/14; H04N 5/16; H04N 5/197; H04N 9/535
[52] U.S. Cl. .................. 358/34; 358/10; 358/166; 358/168; 358/169; 358/171
[58] Field of Search .......... 358/10, 27, 28, 34, 358/37, 39, 139, 160, 168, 169, 171, 174, 181, 184, 219, 221

[56] References Cited

U.S. PATENT DOCUMENTS

| | | | |
|---|---|---|---|
| 3,804,981 | 4/1974 | Avins | 358/168 |
| 3,953,883 | 4/1976 | Grewe | 358/27 |
| 3,955,116 | 5/1976 | Van den Berg | 358/219 |
| 4,053,927 | 10/1977 | Schmidtmann | 358/34 |
| 4,204,229 | 5/1980 | Heuze | 358/169 |
| 4,234,892 | 11/1980 | Mochizuki | 358/174 |
| 4,298,886 | 11/1981 | Perkins | 358/34 |
| 4,340,904 | 7/1982 | Wingrove, Jr. | 358/10 |

Primary Examiner—Tommy P. Chin
Attorney, Agent, or Firm—William J. Kubida

[57] ABSTRACT

An apparatus and method for the automatic setup of a CRT operating point, or dc signal level (black), as well as the contrast, or gain level (gray), of a video display by sampling the CRT signal level of the individual cathodes and locking the dc signal level to a common dc setup reference and gain level to a value determined by a common contrast control signal and gain reference. An apparatus and method in which a common brightness control signal is modulated by a common contrast control signal such that a brightness control pedestal is added to each video signal path of a video display whereby picture black level does not change with contrast.

34 Claims, 1 Drawing Figure

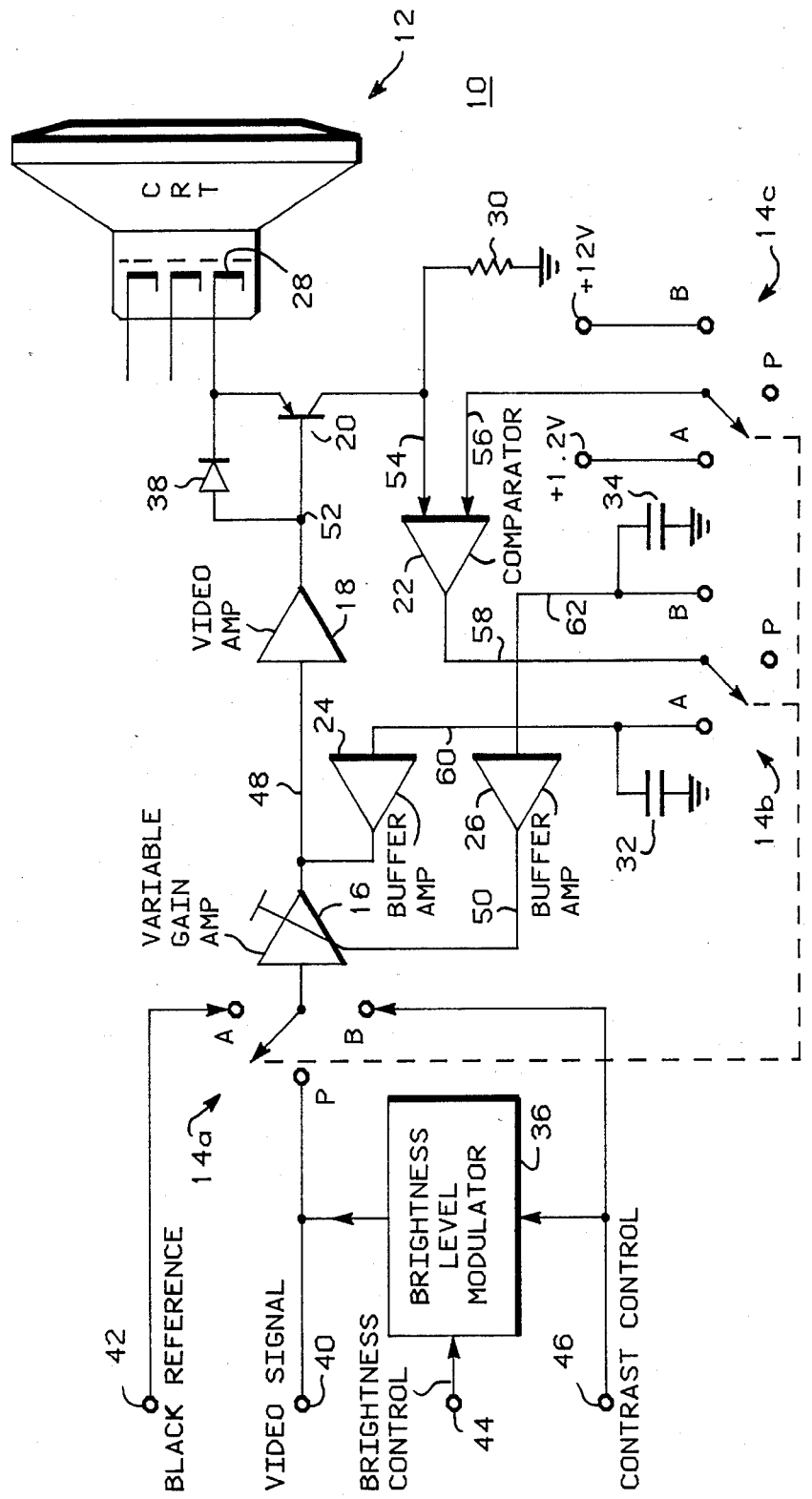

VIDEO DRIVER CIRCUIT AND METHOD FOR AUTOMATIC GRAY SCALE ADJUSTMENT AND ELIMINATION OF CONTRAST TRACKING ERRORS

This is a continuation of co-pending application Ser. No. 388,281 filed on June 14, 1982, now abandoned.

BACKGROUND OF THE INVENTION

In general, the present invention relates to video driver circuits and methods for use with a video display. More particularly, the invention relates to such circuits and methods having associated brightness and contrast controls of particular utility in the color video displays of television and data display units.

In color video display systems such as television receivers and data display units it is necessary to have several signal paths with associated gain controls which must track together. With poor gain tracking between signal paths, an undesirable color error will occur. For example, the gain controls must track such that red, green and blue signals of equal amplitudes give white for all contrast control settings. Moreover, the contrast control of the color difference signals (R-Y and B-Y) must also track accurately.

Previously, in bipolar integrated circuits, gain controls were usually independent current steering devices for each video signal path whose only advantage are their simplicity and small size. However, these individual current steering gain controls have major drawbacks in that $V_{eb}$ matching errors of only five millivolts can give an error of twenty percent in the collector current ratio. Moreover, the gain control law has a limited linear range.

In the past, it has been generally necessary to provide separate drive controls for each of the three signal paths in a color video display. Further, inasmuch as the respective guns of a CRT picture tube age differently, it has been necessary to adjust the drive controls of the CRT throughout its life, particularly during the first twenty-four hours. In this respect, it has been necessary to "burn-in" the set to stabilize operation of the guns such that a final manual adjustment could be made of the respective gain controls.

In this regard, several integrated circuits for television receivers have introduced automatic setting of the CRT operating point, or its dc (black) reference level. However, there has heretofore been no provision for automatic setting of the video gain or contrast (gray) operating point.

Further, the brightness control of a television or video display receiver is usually accomplished by shifting the bias or dc reference level of the video display. This operation has the effect of changing both the average luminance of the display as well as the contrast ratio of the picture. In like manner, the contrast control is normally an amplitude control, the operation of which will also affect average luminance as well as the contrast ratio. In a color television or data display system, saturation and hue may also be affected. Previously, there has been no provision for compensating the brightness control signal such that the picture black level remains unaffected by the contrast control signal.

It is therefore an object of the present invention to provide an improved video driver circuit and method for automatic gray scale adjustment and elimination of contrast tracking errors.

It is further an object of the invention to provide an improved video driver circuit and method for automatic gray scale adjustment and elimination of contrast tracking errors which provides for the accurate tracking of gain between red, green and blue video signal paths in a video display.

It is further an object of the invention to provide an improved video driver circuit and method for automatic gray scale adjustment and elimination of contrast tracking errors which provides the accurate tracking of color difference signals (R-Y and B-Y) in video display.

It is further an object of the invention to provide an improved video driver circuit and method for automatic gray scale adjustment and elimination of contrast tracking errors which obviates the burn-in requirement of a CRT saving setup time and power.

It is further an object of the invention to provide an improved video driver circuit and method for automatic gray scale adjustment and elimination of contrast tracking errors which allows for the elimination of separate drive controls for the separate video signal paths in a color video display.

It is further an object of the invention to provide an improved video driver circuit and method for automatic gray scale adjustment and elimination of contrast tracking errors which provides for the modulation of the brightness control signal by the contrast control signal such that picture black level does not change with contrast.

SUMMARY OF THE INVENTION

The above-mentioned and other objects and advantages of the present invention are provided by an apparatus and method for the automatic setup of the CRT operating point, or dc signal level (black), as well as the contrast, or gain level (gray), of a video display by sampling the CRT signal level of the individual cathodes and locking the dc signal level to a common dc setup reference and gain level to a value determined by a common contrast control signal and gain reference. Also provided is an apparatus and method in which a common brightness control signal is modulated by a common contrast control signal such that a brightness control pedestal is added to each video signal path of a video display such that picture black level does not change with contrast.

BRIEF DESCRIPTION OF THE DRAWING

The above mentioned and other features and objects of the invention and the manner of attaining them will become more apparent and the invention itself will be best understood by reference to the following description of an embodiment of the invention taken in conjunction with the accompanying drawing, wherein:

The FIGURE is a simplified schematic representation of one of three video driver circuits for use in a conventional color video display according to the present invention.

DESCRIPTION OF A PREFERRED EMBODIMENT

Referring now to the FIGURE, a simplified schematic representation of the invention 10 is shown. While the invention 10 is shown only in conjunction with a single cathode of 28 of a conventional cathode ray tube (CRT) 12, similar circuitry would be associated with each individual video signal path. Signals input to black reference input 42, brightness control input 44, contrast control input 46 and hence the output of brightness level modulation 36 would be common to each individual signal path.

As shown, CRT 12 comprises a conventional video display having red, green and blue color guns. A video signal input 40 provides for the input of a respective video signal path to a given cathode 28 of CRT 12 by connection to switch terminal P of time multiplexed switch 14a. An individual video input signal applied to video signal input 40 is, during the time period represented by switch position P, coupled through variable gain amplifier 16 to output line 48. Output line 48 is coupled through video amplifier 18 to video output line 52. Diode 38, which has its anode and cathode respectively connected to the base and emitter of current sampling transistor 20, couples video output line 52 to cathode 28 of CRT 12. The collector lead of current sampling transistor 20 is connected to input line 54 of comparator 22, which is coupled to circuit ground by resistor 30. Reference voltage input line 56 of comparator 22 is connected to the common contact of time multiplexed switch 14c. Time multiplexed switch 14c has a dc setup voltage reference of +1.2 volts at terminal A thereof and a gain setup reference voltage of positive 12 volts at terminal B. Comparator output line 58 of comparator 22 is connected to the common contact of time multiplexed switch 14b. Terminal A of time multiplexed switch 14b is connected to buffer input line 60 of buffer amp 24. Black clamping capacitor 32 couples buffer input line 60 to circuit ground. Buffer input line 62 of buffer amp 26 is connected to terminal B of time multiplexed switch 14b. Gray clamping capacitor 34 couples buffer input line 62 to circuit ground.

The output of buffer amp 24 is connected to output line 48 of variable gain amplifier 16. The output of buffer amp 26 appearing on feedback line 50 is applied to the variable gain terminal of variable gain amplifier 16.

A dc signal is input to black reference input 42 connected to terminal A of time multiplexed switch 14a. A contrast control signal is input to contrast control input 46 for input to terminal B of time multiplexed switch 14a as well as one input of brightness level modulator 36. A brightness control signal is also applied as input to brightness level modulator 36 at brightness control input 44. The output of brightness level modulator 36 is also applied to switch terminal P of time multiplexed switch 14a.

It should be noted that time multiplexed switch 14a, 14b and 14c are switched in sympathy by a control signal derived from the vertical and horizontal scan circuits of the television or data display unit. The control signal in the preferred embodiment is such that for a period of one horizontal scan period following vertial retrace, the time multiplexed switch 14a, 14b and 14c are in position "A". And for another horizontal scan period immediately following, in position "B". In the preferred embodiment, these two time periods are arranged to be two consecutive horizontal scans immediately following vertical retrace. These picture lines are at the top of the picture and can be arranged to be off the active CRT 12 screen area. For the rest of the picture time, time multiplexed switch 14a, 14b and 14c are in position "P". In the description of the invention, the letters "A", "B" and "P" will also be used to denote the time periods of time multiplexed switch 14a, 14b and 14c.

During period "A" the operation of the invention 10 is as follows.

A negative feedback loop is set up via video amplifier 18 and buffer amp 24, comparator 22 and current sampling transistor 20. The loop will cause the voltage developed across resistor 30 to adjust to a value substantially equal to the dc setup voltage reference of +1.2 volts applied to comparator 22 in this condition. The comparator 22 output voltage appearing on comparator output line 58, is applied to the input of buffer amp 24 on buffer input line 60 connected to terminal A of time multiplexed switch 14b. This output voltage will be such that buffer amp 24 furnishes the output signal which need be added to that from variable gain amplifier 16 to provide the necessary input signal to video amplifier 18. Since the CRT 12 cathode current corresponds to the nominal black level in this case, it follows that black will be reproduced whenever the ensuing picture signal matches the level applied at terminal A of time multiplexed switch 14a, assuming only that the gain of variable gain amplifier 16 has not changed in the meantime. In a three-channel system, the ratio of resistors 30 will be chosen such that the system reproduces the desired "black" hue. The feedback loops will eliminate variations due to the CRT 12 gain, which may vary and age differently from gun to gun. In general, the blue gun is the most efficient and therefore a higher value resistance for resistor 30 would be utilized while the red gun is usually the least efficient and therefore a lower resistance would be utilized.

During period "B" the operation is as follows.

A negative feedback loop is set up by video amplifier 18 and buffer amp 26, comparator 22, current sampling transistor 20 and variable gain amplifier 16. The loop will cause the voltage developed across resistor 30 to adjust to a value substantially equal to the gain setup reference voltage of +12 volts now applied to comparator 22 on reference voltage input line 56. The output voltage of comparator 22 on comparator output line 58 is applied to the gain control terminal of variable gain amplifier 16 through buffer amp 26. This will cause the gain of variable gain amplifier 16 to be adapted to the input signal applied thereto at terminal B of time multiplexed switch 14a, such that the total signal applied to video amplifier 18 corresponds to the necessary level. It follows that, other things being equal, the gain of variable gain amplifier 16 will be made inversely proportional to the input signal applied to it at terminal B of time multiplexed switch 14a. Thus, in a three-channel system, it will suffice to apply the same variable level pulse to each of the variable gain amplifiers 16 to impose matching variations of gain. The ratio of the gains in the three channels will be automatically adapted to the ratio of the resistors 30 in each channel, since the three comparators 22 share the same positive 12 volt gain setup reference voltage. Since the black level currents are automatically adapted to the ratio of the three resistors 30 also, it follows that correct hue will be maintained at all signal levels and at all gain or contrast control settings.

During period "P" the operation is as follows.

Brightness control is effected by adding a continuous signal from brightness level modulator 36 to the video input signal applied to video signal input 40. Thus, if a continuous positive signal were added to the video signal level which would have corresponded to nominal black, it would become brighter, whereas, if a continuous negative signal were added, it would become less bright. This continuous signal, or pedestal, must be added to all three channels prior to the input of variable gain amplifier 16, and its amplitude must be modulated in the same manner as the amplitude of the gain control insert or contrast control signal applied to contrast control input 46. If not, the brightness would change with contrast. For example, if the contrast is reduced by 6 dB then the brightness control pedestal added during period "P" must likewise be increased by 6 dB. This requirement is satisfied in the preferred embodiment by varying the level of the brightness control pedestal at the output of brightness level modulator 36 in accordance with the applied contrast control signal applied to contrast control input 46. The circuit is designed such that the output of brightness level modulator 36 varies in inverse proporation to the gains of the variable gain amplifiers 16.

In the preferred embodiment, video amplifier 18 is a high voltage amplifier suitable for the drive of cathode 28 of CRT 12, which it does via diode 38 and current sampling transistor 20 in its emitter follower configuration. It is obvious that the electron beam current of CRT 12 appears as the collector current of current sampling transistor 20 which develops a positive voltage with respect to circuit ground across resistor 30. In the preferred embodiment, the voltage across resistor 30 is restricted to about 18 volts which serves to prevent current sampling transistor 20 from saturating.

Comparator 22 compares the voltage developed across resistor 30 with either the dc setup voltage reference of positive 1.2 volts or the gain setup reference voltage of positive 12 volts as selected by time multiplexed switch 14c. The comparator output voltage on comparator output line 58 is transferred to either black clamping capacitor 32 or gray clamping capacitor 34 by time multiplexed switch 14b.

It is appropriate to mention that digital techniques of storing the samples, such as an analog-to-digital and digital-to-analog method. could be used instead of the black and gray clamping capacitors 32 and 34. Also, resistor 30 could be replaced by a capacitor, the peak voltage reached during the sample period being the integrated current of the CRT 12 over the sample period.

It is also apparent that it is possible to sample at rates other than the vertical scan rate of the television or data display unit. That is, it is reasonable to sample the dc condition after one vertical retrace and then sample the gain one picture frame later. That is, to sample at one-half the vertical scan rate. It is also apparent that comparator 22 may be split into two separate comparators individually enabled by commands during time periods "A" and "B".

The means of limiting the voltage on resistor 30 to prevent current sampling transistor 20 from saturating may also be used as a peak beam limiter. By feeding the limiter current back to the contrast control it is possible to obtain a contrast pulldown signal at a predetermined beam limit. This limit will be determined by the limiter voltage and a resistor with series diode to the 12 volts supply such that the resistor does not effect the sampling process but offers a lower value when the voltage on resistor 30 exceeds the 12 volt supply. It is also desired that variable gain amplifier 16 be dc-balanced such that changes in the gain control loop do not require changes in the dc loop.

What has been provided then is an improved video driver circuit and method for automatic gray scale adjustment and elimination of contrast tracking errors which provides for the accurate tracking of gain between red, green and blue video signal paths in a video display as well as the accurate tracking of R-Y and B-Y color difference signals. The apparatus and method of the invention 10 also obviates the burn-in requirement of a CRT 12 saving setup time and power. Further, the invention 10 allows for the elimination of separate drive controls for the separate video signal paths in a color video display. Finally, the invention 10 provides for the modulation of the brightness control signal by the contrast control signal such that picture black level does not change with contrast.

We claim:

1. A driver circuit for applying a video input signal to a video display comprising
    a gain controlled amplifier having gain input and output terminals and a variable gain terminal thereof, said gain input terminal for receiving said video input signal,
    a video amplifier having video input and output terminals thereof, said video input terminal being connected to said gain output terminal of said gain controlled amplifier, and said video output terminal being coupled to said video display,
    first feedback means sampling a signal level at said video display for establishing a dc operating point at said video input terminal of said video amplifier indicative of an inserted dc setup reference level of said video display,
    second feedback means sampling a signal level at said video display for establishing a gain control voltage level at said variable gain terminal of said gain controlled amplifier indicative of an inserted gain reference level of said video display, and
    contrast control means for applying a variable input gain setup reference signal to said gain input terminal of said gain controlled amplifier whereby said second feedback means compensates for changes in amplitude of said variable input gain setup reference signal.

2. The driver circuit of claim 1 wherein said first feedback means comprises a comparator having as inputs a signal from a video display current sampling means and a dc setup voltage reference.

3. The driver circuit of claim 2 wherein said signal from a video display current sampling means is developed by a transistor coupling a beam current of said video display to a resistor.

4. The driver circuit of claim 2 wherein said dc setup voltage reference is substantially positive 1.2 volts.

5. The driver circuit of claim 1 wherein said first feedback means further comprises a dc operating point sample capacitor coupled thereto for storage of a voltage level representative of said dc operating point.

6. The driver circuit of claim 1 wherein said second feedback means comprises a comparator having as inputs a signal from a video display current sampling means and a gain setup reference voltage.

7. The driver circuit of claim 6 wherein said signal from a video display current sampling means is developed by a transistor coupling a beam current of said video display to a resistor.

8. The driver circuit of claim 6 wherein said gain setup reference voltage is substantially positive 12 volts.

9. The driver circuit of claim 1 wherein said second feedback means further comprises a gain control sample capacitor coupled thereto for storage of a voltage level representative of said gain control voltage level.

10. A video driver circuit for establishing black and gray reference voltage levels for a video signal to a video display comprising
   a gain controlled amplifier having a variable gain control terminal thereof and having as inputs said video signal and a black reference signal,
   a video amplifier coupled to an output of said gain controlled amplifier and having as an input a gray reference signal,
   means coupling an output of said video amplifier to an input of said video display for sampling a level of an input signal to said video display and producing a first reference voltage level signal in response to said black reference signal and producing a second reference voltage level signal in response to said gray reference signal,
   a comparator having an output terminal and first and second input terminals thereof, said first input terminal thereof being alternately coupled to said black and gray reference signals and said second input terminal thereof being correspondingly connected to said first and second reference voltage levels for producing first and second output signals respectively at said output terminal thereof,
   first and second means coupled to said output terminal of said comparator for storage of said first and second output signals respectively, said first storage means being coupled to an input of said video amplifier and said second storage means being coupled to said variable gain control terminal of said gain controlled amplifier, and
   contrast control means for applying a variable input gain setup reference signal to an input of said gain controlled amplifier whereby said second output signal automatically compensates for changes in amplitude of said variable input gain setup reference signal.

11. The video driver circuit of claim 10 wherein said sampling means comprises a transistor coupling a beam current of said video display to a resistor.

12. The video driver circuit of claim 10 wherein said first input terminal of said comparator is alternately coupled to said first and second reference signals by means of a time multiplexed switch.

13. The video driver circuit of claim 12 wherein said first input terminal of said comparator is coupled to said black and gray reference signals for a period of one horizontal scan following vertical retrace.

14. The video driver circuit of claim 10 wherein said second input terminal is alernately connected to said first and second reference voltage levels by means of a time multiplexed switch.

15. The video driver circuit of claim 14 wherein said second input terminal of said comparator is coupled to said first and second reference voltage levels for a period of one horizontal scan following vertical retrace.

16. The video driver circuit of claim 10 wherein said first and second storage means comprise capacitors.

17. A method for the automatic gain adjustment of a video signal to a video driver circuit for a video display comprising the steps of
   sampling a signal level of said video signal at said video display for establishing black and gray signal reference levels,
   firstly comparing said black reference level to an input dc set up reference and locking said signal level of said video signal to said dc setup reference, and
   secondly comparing said gray reference level to a variable input gain setup reference and locking a gain adjustment of said video signal to said variable input gain setup reference.

18. The method of claim 17 wherein said step of sampling is carried out by means of a transistor coupling a beam current of said video display to a resistor.

19. The method of claim 17 wherein said steps of firstly and secondly comparing are carried out by means of a comparator whose output is controllably coupled to a capacitor.

20. The method of claim 17 wherein said steps of firstly and secondly comparing are carried out alternately by means of a time multiplexed switch.

21. A brightness control for a video input signal to a video display comprising
   a contrast control signal indicative of a desired gain of said video input signal,
   a brightness control signal indicative of a desired level of said video input signal, and
   means for multiplying said brightness control signal with said contrast control signal and producing a brightness control pedestal for application to said video input signal,
   whereby the sense and amplitude of said brightness control pedestal is determined by said brightness and contrast control signals respectively.

22. The brightness control of claim 21 wherein said multiplying means comprises a modulator whose output is a signal having an amplitude given by the product of said brightness and contrast control signals.

23. A method for controlling the brightness of a video input signal to a video display comprising the steps of:
   supplying a contrast control signal indicative of a desired gain of said video input signal,
   furnishing a brightness control signal indicative of a desired dc level of said video input signal, and
   multiplying said brightness control signal with said contrast control signal and producing a brightness control pedestal for application to said video input signal,
   whereby the sense and amplitude of said brightness control pedestal is determined by said brightness and contrast control signals respectively.

24. The method of claim 23 wherein said step of multiplying is carried out by means of a modulator whose output is a signal having an amplitude given by the product of said brightness and contrast control signals.

25. A video driver circuit for automatic gray scale adjustment and elimination of contrast tracking errors comprising
   a gain controlled amplifier having gain input and output terminals and a variable gain terminal thereof, said gain input terminal for receiving said video input signal,
   a video amplifier having video input and output terminals thereof, said video input terminal being connected to said gain output terminal of said gain controlled amplifier, and said video output terminal being coupled to said video display,
   first feedback means sampling a signal level at said video display for establishing a dc operating point at said video input terminal of said video amplifier indicative of a dc setup reference level of said video display, second feedback means sampling a signal level at said video display for establishing a gain controlled voltage level at said variable gain terminal at said gain controlled amplifier indicative of a gain reference level of said video display, a contrast control signal indicative of a desired gain of said video input signal, a brightness control signal indicative of a desired dc level of said video input signal, and means for modulating said brightness control signal in accordance with contrast control signal and producing a brightness controlled pedestal for application to said video input signal, whereby the sense and amplitude of said brightness control pedestal is determined by said brightness and contrast control signals respectively.

26. The video driver circuit of claim 25 wherein said first feedback means comprises a comparator having as inputs a signal from a video display current sampling means and a dc setup voltage reference.

27. The video driver circuit of claim 26 wherein said signal from a current sampling means is developed by a transistor coupling a beam current of said video display to a resistor.

28. The video driver circuit of claim 26 wherein said dc setup voltage reference is substantially positive 1.2 volts.

29. The video driver circuit of claim 25 wherein said first feedback means further comprises a dc operating point sample capacitor.

30. The video driver circuit of claim 25 wherein said second feedback means comprises a comparator having as inputs a signal from a video display current sampling means and a gain setup reference voltage.

31. The video driver circuit of claim 30 wherein said signal from a current sampling means is developed by a transistor coupling a beam current of said video display to a resistor.

32. The video driver circuit of claim 30 wherein said gain setup reference voltage is substantially positive 12 volts.

33. The video driver circuit of claim 25 wherein said second feedback means further comprises a gain control sample capacitor.

34. The video driver circuit of claim 25 wherein said modulating means comprises a modulator whose output is a signal having an amplitude given by the product of said brightness and contrast control signals.

* * * * *